3,047,597
PURIFICATION OF PHOSPHATIDES
Hermann Pardun, Cleves, Germany, assignor to Lever Brothers Company, New York, N.Y., a corporation of Maine
No Drawing. Filed May 9, 1960, Ser. No. 27,527
Claims priority, application Great Britain May 12, 1959
6 Claims. (Cl. 260—403)

This invention relates to the purification of phosphatides, particularly those of vegetable origin, such as those derived from oil-containing seeds and fruits.

During the recovery of oils from vegetable matter, particularly seeds or fruits, by pressing or extraction, a crude oil is obtained which normally contains a few percent of dissolved "gums." These can be separated from the oil by treatment with water or aqueous solutions, centrifuging and drying. In this way a crude "vegetable lecithin" is obtained in the form of a yellow to black mass of honey-like to wax-like consistency, which normally contains about 50–70% phosphatides and about 50–30% oil, fatty acids, saccharides and pigments. Such a phosphatide-containing material may for example be obtained from soyabeans, rapeseed, groundnuts, and cottonseed.

The vegetable lecithins have founds many uses, for instance, as emulsifiers in the food industry. In many cases they can be used without further purification, but it is often desirable to purify them, by removing the oil and fatty acids to obtain light-coloured lecithins of good taste. In one method of purification, the crude lecithin is mixed at room temperature with about 4 to 5 times its weight of a liquid, such as acetone or methyl acetate, which has practically no solvent action on phosphatides, but which is a solvent for the oil and fatty acids. A residue remains, which contains practically all the lecithin, and this residue is separated from the liquid by decantation, filtration or centrifuging, washed repeatedly with fresh liquid, and then mixed with refined oil or fat and freed from residual liquid by evaporation. The purified lecithin obtained in this way is used in the preparation of pharmaceutical compositions, margarine, and chocolate, and for many other purposes.

The method just described has however the disadvantage that the phosphatide concentrate resulting from treatment of the crude phosphatide-containing material with the liquid (acetone or methyl acetate, for example) to dissolve out the oil and fatty acid, is obtained in the form of a sticky powder, which is difficult to deal with subsequently.

In treating phosphatide-containing materials to purify the phosphatide by the method of the present invention, the disadvantage referred to can be avoided, and the operation of obtaining phosphatides of a desired degree of purity can be considerably simplified.

According to the invention, the phosphatide-containing material to be purified is treated both with a liquid which has practically no solvent action on phosphatides (a "non-solvent liquid") and with a liquid which is a phosphatide solvent, these liquids being used in a proportion such that two liquid phases are formed during the treatment of the phosphatides, the solvent phase containing most of the phosphatide, the two phases are separated and the solvent phase is heated to remove solvent. Preferably, the non-dissolving liquid and the phosphatide solvent are used in a volume proportion between 2:1 and 6:1. Of the liquid phases obtained, one (the non-dissolving liquid phase) will contain the oil and fatty acid associated with the crude phosphatide-containing material but will contain practically no phosphatides, these being concentrated in the phosphatide solvent liquid phase. The non-dissolving liquid and the phosphatide-solvent liquid are preferably added to the phosphatide-containing material simultaneously, conveniently as a mixture; however, the phosphatide-solvent liquid can first be added to the material, followed by the non-dissolving liquid.

Among liquids which do not dissolve the phosphatides of vegetable lecithin to an appreciable extent, we prefer to employ as the non-solvent liquid those which are neutral organic compounds of carbon, hydrogen and oxygen only which contain a carbonyl group and especially those which are ketones or alkyl esters of aliphatic acids. They should preferably be of boiling point, not exceeding about 80° C. Among ketones and esters having the desired non-solvent properties, acetone, methyl acetate, ethyl acetate, methyl formate and ethyl formate, have been found useful. These liquids may contain small proportions of other components, such as water. For example, acetone containing up to 10% water may be used with advantage.

As phosphatide solvent liquids we prefer to use those which are hydrocarbons or chlorinated hydrocarbons containing not more than 7 carbon atoms especially aliphatic, cycloaliphatic or aromatic hydrocarbons containing 5 to 7 carbon atoms, such for example as n-pentane, n-hexane, n-heptane, cyclohexane, methylcyclohexane or benzene, and halogenated hydrocarbons, especially those containing one or two carbon atoms, such as dichloromethane or dichloroethylene. It is of advantage for the boiling point of the solvent to be not greater than about 100° C.

The proportion between non-dissolving and phosphatide-solvent liquids will depend upon the particular liquids chosen and their ability to form separate liquid phases in the presence of phosphatides. It has been found that in general a proportion of less than two parts of non-dissolving liquid to one part of phosphatide-solvent liquid tends to diminish the ability to form two liquid phases in the presence of phosphatides, while a proportion of more than six parts of non-dissolving liquid to one part of phosphatide-solvent liquid may sometimes give a sticky product.

It has been found advantageous to use a non-dissolving liquid and a phosphatide-solvent liquid which can together form an azeotropic mixture of minimum boiling point. Thus the use of lower temperatures to distil or evaporate off the liquids after treatment is made possible, or alternatively, the use of liquids of rather higher boiling point is facilitated.

The weight proportion between the phosphatide-containing materials to be treated and the sum of non-dissolving and phosphatide-solvent liquids used should preferably lie between 1:1.5 and 1:10, particularly between 1:2 and 1:5.

The method of the invention can be performed simply by mixing the crude phosphatide-containing material with the non-dissolving and phosphatide-solvent liquids, allowing the two liquid phases to separate, and removing one of them, for example, by decantation. This procedure can if necessary be repeated several times, until the impurities content of the material has been reduced to a desired low proportion. The method is preferably carried out at room temperature or slightly above, for example 15 to 40° C.

The phosphatide-solvent phase containing phosphatides dissolved therein can then be freed from the liquid by evaporation, conveniently under reduced pressure. In this way, the purified phosphatides can be obtained in a solid non-sticky form. Alternatively the liquid containing the phosphaides can be mixed with other components, such for example as refined vegetable oils or partial glycerides, glycerol, sorbitol, sugars and other polyhydroxy compounds or their partial esters, and then freed from the phosphatide-solvent liquid by evaporation. In this way, the purified phosphatides are obtained in a plastic form.

The non-solvent phase containing oils, fatty acids and other impurities can be freed from the non-dissolving liquid by evaporation to obtain the impurities.

The method of the invention can be carried out continuously by methods such as the well known counter-current extraction procedure or the use of liquid-liquid counter current separators.

By the invention phosphatides can be obtained light-coloured and with an excellent neutral taste, so that they can be used in foods, without affecting the taste of the food, in much greater proportions than can the crude phosphatides.

By using the invention, fractionation of the phosphatides is avoided.

The invention is illustrated in detail by the following examples:

Example 1

40 kg. crude soyabean lecithin with a phosphatide content of 68% were mixed with 120 kg. of a mixture containing 78% acetone and 22% n-pentane at a temperature of 20° C. during 10 min. under intensive stirring. After 30 min. rest the two liquid phases had separated and the upper layer was drawn off. The lower layer was again treated with 120 kg. of the above mixture under the same conditions. The lower layer remaining after the second treatment was evaporated under a vacuum of 10 mm. Hg at a temperature of 50° C. In this way 24 kg. purified lecithin with a phosphatide content of 91.7% were obtained. The purified lecithin had a light yellow colour and practically no taste and odour.

Example 2

100 kg. crude rapeseed lecithin with aphosphatide content of 66% were mixed with 290 litres of a mixture containing 66% by weight of acetone and 34% by weight of cyclohexane at a temperature of 20° C. during 15 min. under intensive stirring. After 40 min. rest the two liquid phases had separated. The lower layer was drawn off, mixed with 34 kg. refined cottonseed oil and freed from solvent by evaporation at a temperature of 50° C. and a pressure of 10 mm. Hg. In this way 101 kg. of a light brown, oil-containing purified rapeseed lecithin was obtained.

Example 3

To a solution of 200 kg. soyabean lecithin with a phosphatide content of 67.8% in 200 litres dichlorethylene, 1100 litres methyl acetate were added in small portions by means of a ratio-controller. The mixture was separated continuously at a temperature of 20° C. in a drum centrifuge into a light and a heavy liquid phase. The heavy liquid phase was evaporated at a temperature of 50° C. under a pressure of 10 mm. Hg. In this way 123 kg. of purified lecithin with a phosphatide content of 94% was obtained.

Example 4

20 kg. crude soyabean lecithin with a phosphatide content of 68% was dissolved at a temperature of 15° C. in 20 litres technical heptane under stirring. To this mixture 51 litres technical acetone containing 1% water was added under stirring. After 30 min. rest the two liquid phases had separated and the lower layer was drawn off and evaporated at a temperature of 50° C. and a pressure of 10 mm. Hg. In this way 15.2 kg. of purified lecithin with a phosphatide content of 88.5% was obtained.

Example 5

20 kg. of crude soyabean lecithin with a phosphatide content of 68% were dissolved at a temperature of 20° C. in 30 litres of hexane while stirring. To this mixture 53 litres of methyl formate were added while under stirring. After 30 minutes' rest the two liquid phases had separated and the lower layer was drawn off and evaporated at a temperature of 50° C. and a pressure of 10 mm. In this way 15 kg. of purified lecithin with a phosphatide content of 89.8% were obtained.

Example 6

20 kg. of crude soyabean lecithin with a phosphatide content of 68% were dissolved at a temperature of 20° C. in 30 litres of hexane under stirring. To this mixture 78 litres of ethyl formate were added under stirring. After 30 minutes' rest the two liquid phases had separated and the lower layer was drawn off and evaporated at a temperature of 50° C. and a pressure of 10 mm. In this way 13 kg. of purified lecithin with a phosphatide content of 86.5% were obtained.

What is claimed is:

1. Process for obtaining an improved phosphatide product from crude vegetable lecithin, which comprises subjecting the crude lecithtin to the action of two liquids in admixture,
   one being a solvent for the phosphatide, selected from the class consisting of cyclohexane, saturated aliphatic hydrocarbons containing 5 to 7 carbon atoms, and chlorinated aliphatic hydrocarbons containing up to 2 carbon atoms and boiling below 100° C.,
   and the other a non-solvent for the phosphatide, selected from the class consisting of acetone, methyl acetate, ethyl acetate, methyl formate and ethyl formate,
   said solvent and non-solvent being present in the mixture in such proportions that two liquid phases are formed during the treatment, the solvent phase containing most of the phosphatide, the said proportions lying between 2 and 6 parts by volume of non-solvent to 1 of solvent and the weight ratio of solvent plus non-solvent to crude lecithin being between 1.5:1 and 10:1,
   separating the two phases and recovering the improved phosphatide from the solvent phase by removal of the solvent therefrom.

2. Process for obtaining an improved phosphatide product from crude vegetable lecithin, which comprises subjecting the crude lecithtin to the action of two liquids in admixture,
   one being a saturated aliphatic hydrocarbon containing 5 to 7 carbon atoms, and the other being acetone,
   said liquids being present in the mixture in such proportions that two liquid phases are formed during the treatment, the hydrocarbon phase containing most of the phosphatide, the said proportions lying between 2 and 6 parts by volume of the acetone to 1 of hydrocarbon and the weight-ratio of hydrocarbon plus acetone to crude lecithin being between 1.5:1 and 10:1,
   separating the two phases and recovering the improved phosphatide from the hydrocarbon phase by removal of the hydrocarbon therefrom.

3. Process for obtaining an improved phosphatide product from crude vegetable lecithin, which comprises subjecting the crude lecithtin to the action of two liquids in admixture, one being cyclohexane and the other acetone,
   said liquids being present in the mixture in such proportions that two liquid phases are formed during the treatment, the cyclohexane phase containing most of the phosphatide, the said proportions lying between 2 and 6 parts by volume of the acetone to 1 of cyclohexans and the weight-ratio of cyclohexane plus acetone to crude lecithin being between 1.5:1 and 10:1,
   separating the two phases and recovering the improved phosphatide from the cyclohexane phase by removal of the cyclohexane therefrom.

4. Process for obtaining an improved phosphatide product from crude vegetable lecithin, which comprises subjecting the crude lecithtin to the action of two liquids in admixture, one being dichlorethylene and the other methyl acetate, said liquids being present in the mixture in such proportions that two liquid phases are formed during the treatment, the dichlorethylene phase containing most of the phosphatide, the said proportions lying between 2 and 6 parts by volume of the methyl acetate to 1 of dichlorethylene and the weight-ratio of dichlorethylene plus methyl acetate to crude lecithin being between 1.5:1 and 10:1, separating the two phases and recovering the improved phosphatide from the dichlorethylene phase by removal of the dichlorethylene therefrom.

5. Process for obtaining an improved phosphatide product from crude vegetable lecithin, which comprises subjecting the crude lecithtin to the action of two liquids in admixture, one being n-pentane and the other acetone, said liquids being present in the mixture in such proportions that two liquid phases are formed during the treatment, the n-pentane phase containing most of the phosphatide, the said proportions lying between 2 and 6 parts by volume of the acetone to 1 of n-pentane and the weight-ratio of n-pentane plus acetone to crude lecithin being between 1.5:1 and 10:1, separating the two phases and recovering the improved phosphatide from the n-pentane phase by removal of the n-pentane therefrom.

6. Process for obtaining an improved phosphatide product from crude vegetable lecithin, which comprises subjecting the crude lecithtin to the action of two liquids in admixture, one being n-heptane and the other acetone, said liquids being present in the mixture in such proportions that two liquid phases are formed during the treatment, the n-heptane phase containing most of the phosphatide, the said proportions lying between 2 and 6 parts by volume of the acetone to 1 of n-heptane and the weight-ratio of n-heptane plus acetone to crude lecithin being between 1.5:1 and 10:1, separating the two phases and recovering the improved phosphatide from the n-heptane phase by removal of the n-heptane therefrom.

References Cited in the file of this patent

UNITED STATES PATENTS

| | | |
|---|---|---|
| 2,150,732 | Thurman | Mar. 14, 1939 |
| 2,201,064 | Thurman | May 14, 1940 |
| 2,271,127 | Mattikow | Jan. 27, 1942 |
| 2,640,780 | Mattikow | June 2, 1953 |
| 2,801,255 | Scholfield et al. | July 30, 1957 |